United States Patent
Hayashi

(10) Patent No.: US 7,535,820 B2
(45) Date of Patent: May 19, 2009

(54) OFDM SIGNAL RECEIVING APPARATUS AND OFDM SIGNAL RECEIVING METHOD

(75) Inventor: Kenichiro Hayashi, Kyotanabe (JP)

(73) Assignee: Panasonic Corporation, Osaka (JP)

( * ) Notice: Subject to any disclaimer, the term of this patent is extended or adjusted under 35 U.S.C. 154(b) by 792 days.

(21) Appl. No.: 10/954,614

(22) Filed: Oct. 1, 2004

(65) Prior Publication Data

US 2005/0073949 A1    Apr. 7, 2005

(30) Foreign Application Priority Data

Oct. 1, 2003 (JP) ............................. 2003-342990

(51) Int. Cl.
*H04J 11/00* (2006.01)

(52) U.S. Cl. .................. 370/208; 370/210; 375/260

(58) Field of Classification Search ............ 370/203, 370/208, 210, 215, 204, 206; 375/260, 261, 375/262, 268, 269, 271, 272, 273, 278, 316, 375/320, 329, 334, 341, 353
See application file for complete search history.

(56) References Cited

U.S. PATENT DOCUMENTS

| 5,307,376 A | 4/1994 | Castelain et al. |
| 6,654,429 B1 | 11/2003 | Li |
| 7,242,720 B2 * | 7/2007 | Sugiyama et al. ............ 375/260 |
| 2003/0227866 A1 | 12/2003 | Yamaguchi |

FOREIGN PATENT DOCUMENTS

| JP | 5-75568 | 3/1993 |
| JP | 10-75226 | 3/1998 |
| JP | 2000-341242 | 12/2000 |
| JP | 2002-64413 | 2/2002 |
| JP | 2003-101503 | 4/2003 |
| JP | 2003-218827 | 7/2003 |
| JP | 2004-032748 | 1/2004 |
| JP | 2004-147118 | 5/2004 |

OTHER PUBLICATIONS

Principle and Application for OFDM mobile Communication Technology, p. 126 (with partial translation), 2003.

* cited by examiner

*Primary Examiner*—Ricky Ngo
*Assistant Examiner*—Gary Mui
(74) *Attorney, Agent, or Firm*—Wenderoth, Lind & Ponack, L.L.P.

(57) ABSTRACT

An OFDM signal receiver reduces frequency response estimation error, and reduces the circuit scale needed for a hardware implementation and the number of operations performed in a software implementation. A first Fourier transform circuit converts an OFDM signal to the frequency domain by a Fourier transform. A first divider divides the pilot signal contained in the frequency domain OFDM signal by a specified pilot signal. A zero insertion means then inserts zero signals in the first divider output. A window function multiplying means multiplies the zero insertion means output by a window function, and an inverse Fourier transform means applies an inverse Fourier transform to the multiplier output. A coring means then cores the inverse Fourier transform output, and truncation means truncates the coring means output at a specified data length. A second Fourier transform circuit applies another Fourier transform to the truncated result. A window function dividing means then divides the Fourier transform result by the window function, and a second dividing means divides the output of the first Fourier transform means by the output of the window function dividing means.

2 Claims, 14 Drawing Sheets

OFDM SIGNAL RECEIVING APPARATUS AND OFDM SIGNAL RECEIVING METHOD

BACKGROUND OF THE INVENTION

1. Field of Technology

The present invention relates to a receiving apparatus and receiving method for receiving signals transmitted using an OFDM (orthogonal frequency division multiplexing) system.

2. Description of Related Art

The OFDM signal transmission system modulates multiple mutually orthogonal carriers with the digital data being transmitted, and then multiplexes these modulated signals before transmission. Increasing the number of carriers from several hundred to several thousand for OFDM transmission significantly increases the symbol period compared with a single carrier system at the same transmission rate, and thus lowers the likelihood of multipath interference.

In a multipath environment, however, the amplitude and phase of each carrier changes on the channel, and the receiver must compensate for this change. All or part of an OFDM carrier is therefore used to transmit a pilot signal (a signal of known amplitude and phase).

The receiver can therefore estimate from the received pilot signal how the carrier changed on the channel, or more specifically can estimate the frequency response of the channel, and compensate accordingly. For example, the pilot signal used in the DVB-T (Digital Video Broadcast-Terrestrial: digital terrestrial television system used in Europe) and in the ISDB-T (Integrated Services Digital Broadcasting-Terrestrial: digital terrestrial television system used in Japan) is called a "scattered pilot" and is scattered over the carrier-symbol plane.

FIG. 11 is a block diagram of the OFDM signal demodulator 12a taught in U.S. Pat. No. 5,307,376 (Japanese Patent No. 3044899).

In the channel estimation circuit 23a shown in FIG. 11, the pilot signal extraction circuit 31 extracts the pilot signal contained in the output of the Fourier transform circuit 22, and outputs the result to the first input of a divider 33.

The pilot signal generator 32 generates a pilot signal of known amplitude and phase synchronized to the pilot signal extraction circuit 31, and outputs the resulting pilot signal to the second input of the divider 33.

The divider 33 then divides the output of the pilot signal extraction circuit 31 by the output of the pilot signal generator 32 to acquire the frequency response of the channel sampled at the pilot signal interval, and then outputs the result to the zero signal insertion circuit 34a.

The zero signal insertion circuit 34a inserts a zero signal to the output of the divider 33, and supplies the result to the inverse Fourier transform circuit 35a.

The inverse Fourier transform circuit 35a converts the frequency response output from the zero signal insertion circuit 34a to an impulse response, and outputs the result to the coring circuit 36a.

The coring circuit 36a replaces data equal to or less than a specified threshold value in the output of the inverse Fourier transform circuit 35a with a zero signal, and outputs the result to the truncation circuit 37a.

The truncation circuit 37a truncates the coring circuit output to a specified length and replaces other data with a zero signal to remove aliasing components (due to the frequency response, which is the input to the inverse Fourier transform circuit 35a, being sampled at the pilot signal period). The truncation circuit 37a outputs the result to the Fourier transform circuit 38a.

The Fourier transform circuit 38a generates the interpolated frequency response (having values at positions other than the pilot signal) by Fourier transform of the impulse response output from the truncation circuit 37a. The output from the Fourier transform circuit 38a is then supplied as the output of the channel estimation circuit 23a to the second input to the divider 24.

Note that the DFT block 11 shown in FIG. 1 in the above-noted U.S. Pat. No. 5,307,376 corresponds to the Fourier transform circuit 22 shown in FIG. 11; the projection block 12 similarly shown in U.S. Pat. No. 5,307,376 corresponds to the divider 24 in FIG. 11; N/R sample extraction circuit 13 similarly shown in U.S. Pat. No. 5,307,376 corresponds to the circuit block including the pilot signal generator 32, divider 33, and zero signal insertion circuit 34a in FIG. 11; $DFT^{-1}$ 14 similarly shown in U.S. Pat. No. 5,307,376 corresponds to the inverse Fourier transform circuit 35a in FIG. 11; weighting circuit 15 similarly shown in U.S. Pat. No. 5,307,376 corresponds to the truncation circuit 37a in FIG. 11; DFT 16 similarly shown in U.S. Pat. No. 5,307,376 corresponds to the Fourier transform circuit 38a in FIG. 11; and thresholding block 17 similarly shown in U.S. Pat. No. 5,307,376 corresponds to the coring circuit 36a in FIG. 11.

Operation of the channel estimation circuit 23a shown in FIG. 11 is described next below with reference to FIG. 12. In FIG. 12 n is an index denoting the sampling time, and N denotes the number of samples processed by the inverse Fourier transform circuit 35a and Fourier transform circuit 38a.

FIG. 12(a) shows an example of output from the inverse Fourier transform circuit 35a wherein 101a to 101d denote the normal impulse response, 102a to 102d through 112a to 112d denote the aliasing component, and the shaded area indicates the noise component 121. Aliasing occurs every N/12 samples because the scattered pilot signal in the DVB-T and ISDB-T systems is located every 12 carriers in each symbol.

FIG. 12(b) shows an example of output from the coring circuit 36a. The coring circuit 36a replaces data equal to or less than a specified threshold value (th) with zero signals. Data other than 101a to 101c, and 102a to 102c through 112a to 112c are therefore replaced by zero signals in the example shown in FIG. 12, and the power of noise components is therefore significantly suppressed.

FIG. 12(c) shows the output of the truncation circuit 37a. Note that aliasing components 102a to 102c through 112a to 112c are removed because the truncation circuit 37a substitutes zero signals for data with an index greater than N/12.

The frequency response acquired by the Fourier transform circuit 38a applying Fourier transform to the output of the truncation circuit 37a is thus not only interpolated, but estimation error due to noise is reduced by the operation of the coring circuit 36a.

[Problem to be Solved]

When Impulse response does not coincide with the sampling time in this prior art configuration, output from the inverse Fourier transform circuit 35a has side lobes rather than being a single impulse. Furthermore, when impulse response is at the sampling time, output from the inverse Fourier transform circuit 35a also has side lobes rather than being a single impulse because the bandwidth of the output from the zero signal insertion circuit 34a is narrower than the input bandwidth of the inverse Fourier transform circuit 35a.

When such impulse response is then input to the coring circuit 36a, side lobe components at or below the threshold value th are replaced by zero signals. This produces distortion in the frequency response obtained as the output of the Fourier transform circuit 38a.

The inverse Fourier transform circuit 35a and Fourier transform circuit 38a must also process the same number of data samples as the main Fourier Transform circuit 22, leading to an increased circuit size if this operation is run in dedicated hardware, and an increased processing load if run in software using general-purpose hardware such as a DSP (digital signal processor).

The present invention is directed to solving the foregoing problem, and an object of the invention is to provide an OFDM signal receiving apparatus that reduces frequency response estimation error while also reducing the circuit scale required for a hardware implementation and the processing load required for a software implementation.

SUMMARY OF THE INVENTION

To achieve the foregoing object, a first aspect of the present invention is a receiving apparatus for receiving OFDM (orthogonal frequency division multiplexing) signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; a zero insertion means for inserting zero signals to the first frequency response, and generating a second frequency response; a window function multiplying means for multiplying the second frequency response by a window function, and generating a third frequency response; an inverse Fourier transform means for generating a first impulse response by an inverse Fourier transform of the third frequency response; a coring means for replacing data in the first impulse response less than or equal to a specified threshold value with zero signals, and generating a second impulse response; a truncation means for truncating the second impulse response at a specified data length, replacing other data with zero signals, and generating a third impulse response; a second Fourier transform means for generating a fourth frequency response by a Fourier transform of the third impulse response; a window function dividing means for dividing the fourth frequency response by the window function, and generating a fifth frequency response; and a second dividing means for dividing the frequency domain OFDM signal by the fifth frequency response to compensate for amplitude and phase distortion introduced to the signal on the channel.

A second aspect of the invention is an OFDM signal receiving apparatus for receiving OFDM signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; a zero insertion means for inserting zero signals to the first frequency response, and generating a second frequency response; an inverse Fourier transform means for generating a first impulse response by an inverse Fourier transform of the second frequency response; a coring means for replacing data in the first impulse response less than or equal to a specified threshold value with zero signals, and generating a second impulse response; a truncation means for truncating the second impulse response at a specified data length, replacing other data with zero signals, and generating a third impulse response; a second Fourier transform means for generating a third frequency response by a Fourier transform of the third impulse response; a time axis interpolation means for interpolating the first frequency response along the time axis, and generating a fourth frequency response; a frequency axis interpolation means for interpolating the fourth frequency response along the frequency axis, and generating a fifth frequency response; a selection means for selecting the third frequency response for carriers within a specific range of the signal band center, selecting the fifth frequency response for the remaining carriers near the signal band edges, and generating a sixth frequency response; and a second dividing means for dividing the frequency domain OFDM signal by the sixth frequency response to compensate for amplitude and phase distortion introduced to the signal on the channel.

A third aspect of the invention is an OFDM signal receiving apparatus for receiving OFDM signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; a zero insertion means for inserting zero signals to the first frequency response, and generating a second frequency response; a window function multiplying means for multiplying the second frequency response by a window function, and generating a third frequency response; an inverse Fourier transform means for generating a first impulse response by an inverse Fourier transform of the third frequency response; a coring means for replacing data in the first impulse response less than or equal to a specified threshold value with zero signals, and generating a second impulse response; a truncation means for truncating the second impulse response at a specified data length, replacing other data with zero signals, and generating a third impulse response; a second Fourier transform means for generating a fourth frequency response by a Fourier transform of the third impulse response; a window function dividing means for dividing the fourth frequency response by the window function, and generating a fifth frequency response; a time axis interpolation means for interpolating the first frequency response along the time axis, and generating a sixth frequency response; a frequency axis interpolation means for interpolating the sixth frequency response along the frequency axis, and generating a seventh frequency response; a selection means for selecting the fifth frequency response for carriers within a specific range of the signal band center, selecting the seventh frequency response for the remaining carriers near the signal band edges, and generating an eighth frequency response; and a second dividing means for dividing the frequency domain OFDM signal by the eighth frequency response to compensate for amplitude and phase distortion introduced to the signal on the channel.

A fourth aspect of the invention is an OFDM signal receiving apparatus as described in aspect 1 or 3 above wherein the window function multiplying means is disposed upstream of the zero insertion means.

A fifth aspect of the invention is an OFDM signal receiving apparatus for receiving OFDM signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; an inverse Fourier transform means for generating a first impulse response by an inverse Fourier transform of the first frequency response; a coring means for replacing data in the first impulse response less than or equal to a specified threshold value with zero signals, and generating a second impulse response; a second Fourier transform means for generating a second frequency response by a Fourier transform of the second impulse response; a time axis interpolation means for interpolating the second frequency response along the time axis, and generating a third frequency response; a frequency axis interpolation means for interpolating the third frequency response along the frequency axis, and generating a fourth frequency response; and a second dividing means for dividing the frequency domain OFDM signal by the fourth frequency response to compensate for amplitude and phase distortion introduced to the signal on the channel.

A sixth aspect of the invention is an OFDM signal receiving apparatus for receiving OFDM signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; a window function multiplying means for multiplying the first frequency response by a window function, and generating a second frequency response; an inverse Fourier transform means for generating a first impulse response by an inverse Fourier transform of the second frequency response; a coring means for replacing data in the first impulse response less than or equal to a specified threshold value with zero signals, and generating a second impulse response; a second Fourier transform means for generating a third frequency response by a Fourier transform of the second impulse response; a window function dividing means for dividing the third frequency response by the window function, and generating a fourth frequency response; a time axis interpolation means for interpolating the fourth frequency response along the time axis, and generating a fifth frequency response; a frequency axis interpolation means for interpolating the fifth frequency response along the frequency axis, and generating a sixth frequency response; and a second dividing means for dividing the frequency domain OFDM signal by the sixth frequency response to compensate for amplitude and phase distortion introduced to the signal on the channel.

A seventh aspect of the invention is an OFDM signal receiving apparatus for receiving OFDM signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; a coring means for replacing data in the first impulse response less than or equal to a specified threshold value with zero signals, and generating a second impulse response; a second Fourier transform means for generating a second frequency response by a Fourier transform of the second impulse response; a selection means for selecting the second frequency response for carriers within a specific range of the signal band center, selecting the first frequency response for the remaining carriers near the signal band edges, and generating a third frequency response; a time axis interpolation means for interpolating the third frequency response along the time axis, and generating a fourth frequency response; a frequency axis interpolation means for interpolating the fourth frequency response along the frequency axis, and generating a fifth frequency response; a second dividing means for dividing the frequency domain OFDM signal by the fifth frequency response to compensate for amplitude and phase distortion introduced to the signal on the channel.

An eighth aspect of the invention is an OFDM signal receiving apparatus for receiving OFDM signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; a window function multiplying means for multiplying the first frequency response by a window function, and generating a second frequency response; an inverse Fourier transform means for generating a first impulse response by an inverse Fourier transform of the second frequency response; a coring means for replacing data in the first impulse response less than or equal to a specified threshold value with zero signals, and generating a second impulse response; a second Fourier transform means for generating a third frequency response by a Fourier transform of the second impulse response; a window function dividing means for dividing the third frequency response by the window function, and generating a fourth frequency response; a selection means for selecting the fourth frequency response for carriers within a specific range of the signal band center, selecting the first frequency response for the remaining carriers near the signal band edges, and generating a fifth frequency response; a time axis interpolation means for interpolating the fifth frequency response along the time axis, and generating a sixth frequency response; a frequency axis interpolation means for interpolating the sixth frequency response along the frequency axis, and generating a seventh frequency response; a second dividing means for dividing the frequency domain OFDM signal by the seventh frequency response to compensate for amplitude and phase distortion introduced to the signal on the channel.

A ninth aspect of the invention OFDM signal receiving apparatus as described in the foregoing aspect 5 or 7 wherein the time axis interpolating means is disposed upstream of the inverse Fourier transform means.

A tenth aspect of the invention is an OFDM signal receiving apparatus as described in the foregoing aspect 6 or 8 wherein the time axis interpolating means is disposed upstream of the window function multiplying means.

An eleventh aspect of the invention is an OFDM signal receiving apparatus for receiving OFDM signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; a window function multiplying means for multiplying the first frequency response by a window function, and generating a second frequency response; an inverse Fourier transform means for generating a first impulse response by an inverse Fourier transform of the second frequency response; a coring means for replacing data in the first impulse response less than or equal to a specified threshold value with zero signals, and generating a second impulse response; a second Fourier transform means for generating a third frequency response by a Fourier transform of the second impulse response; a window function dividing means for dividing the third frequency response by the window function, and generating a fourth frequency response; a holding means for holding the fourth frequency response for a specific time, and generating a fifth frequency response; and a second dividing means for dividing the frequency domain OFDM signal by the fifth frequency response to compensate for amplitude and phase distortion introduced to the signal on the channel.

A twelfth aspect of the invention is an OFDM signal receiving apparatus for receiving OFDM signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; a coring means for replacing data in the first impulse response less than or equal to a specified threshold value with zero signals, and generating a second impulse response; a second Fourier transform means for generating a second frequency response by a Fourier transform of the second impulse response; a selection means for selecting the second frequency response for carriers within a specific range of the signal band center, selecting the first frequency response for the remaining carriers near the signal band edges, and generating a third frequency response; a holding means for holding the third frequency response for a specific time, and generating a fourth frequency response; and a second dividing means for dividing the frequency domain OFDM signal by the fourth frequency response to compensate for amplitude and phase distortion introduced to the signal on the channel.

A thirteenth aspect of the invention is an OFDM signal receiving apparatus for receiving OFDM signals containing a pilot signal of known amplitude and phase, the OFDM signal receiving apparatus including a first Fourier transform means for generating an OFDM signal in the frequency domain by a Fourier transform of the OFDM signal; a first dividing means for dividing the pilot signal contained in the frequency domain OFDM signal by a specified pilot signal, and generating a first frequency response; a window function multiplying means for multiplying the first frequency response by a window function, and generating a second frequency response; an inverse Fourier transform means for generating a first impulse response by an inverse Fourier transform of the second frequency response; a coring means for replacing data in the first impulse response less than or equal to a specified threshold value with zero signals, and generating a second impulse response; a second Fourier transform means for generating a third frequency response by a Fourier transform of the second impulse response; a window function dividing means for dividing the third frequency response by the window function, and generating a fourth frequency response; a selection means for selecting the fourth frequency response for carriers within a specific range of the signal band center, selecting the first frequency response for the remaining carriers near the signal band edges, and generating a fifth frequency response; a holding means for holding the fifth frequency response for a specific time, and generating a sixth frequency response; and a second dividing means for dividing the frequency domain OFDM signal by the sixth frequency response to compensate for amplitude and phase distortion introduced to the signal on the channel.

A fourteenth aspect of the invention is an OFDM signal receiving apparatus as described in any one of aspects 11 to 13 wherein the OFDM signal has a finite length frame structure including a pilot symbol of known amplitude and phase for all carriers as the preamble; and the holding means holds the frequency response to the end of the frame.

A fifteenth aspect of the invention is an OFDM signal receiving apparatus as described in any one of aspects 11 to 13 wherein the OFDM signal has a continuous frame structure with a pilot symbol of known amplitude and phase for all carriers inserted each frame period; and the holding means holds the frequency response for the frame period.

A sixteenth aspect of the invention is an OFDM signal receiving apparatus as described in any one of aspects 1 to 15 wherein the threshold value used by the coring means is constant.

A seventeenth aspect of the invention is an OFDM signal receiving apparatus as described in any one of aspects 1 to 15 wherein the threshold value used by the coring means is appropriately controlled.

An eighteenth aspect of the invention is an OFDM signal receiving apparatus as described in aspect 17 wherein the threshold value used by the coring means is controlled according to the impulse response.

A nineteenth aspect of the invention is an OFDM signal receiving apparatus as described in aspect 17 wherein the threshold value used by the coring means is controlled according to the noise level.

A twentieth aspect of the invention is an OFDM signal receiving apparatus as described in aspect 1, 3, 6, 8, 11, or 13 wherein the window function is a Hamming window, Hanning window, or Blackman window.

[Effect of the Invention]

An OFDM signal receiving apparatus according to the present invention improves reception performance by reducing frequency response estimation error, and reduces the circuit scale required for a hardware implementation and the processing load required for a software implementation.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 9:
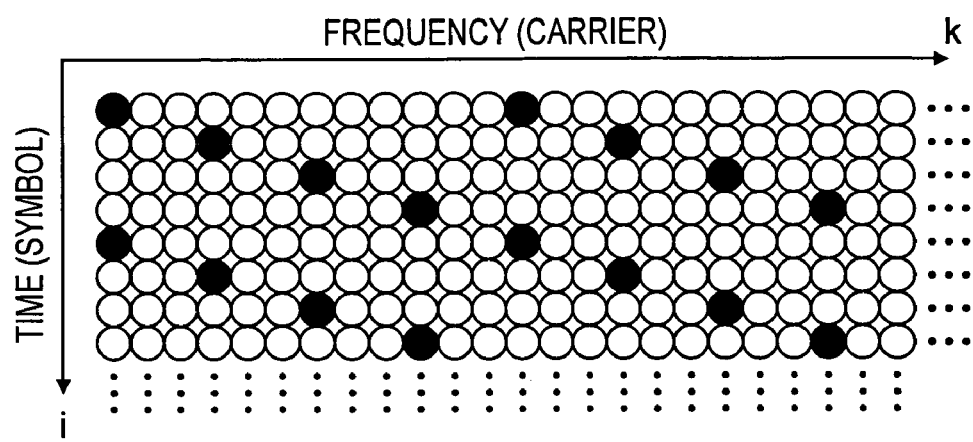
FIG. 9 is a schematic diagram showing the arrangement of a pilot signal in the present invention.

FIG. 9 shows an example of a signal received by the OFDM signal receiver of the present invention, and schematically shows pilot signal arrangement in the DVB-T and ISDB-T systems. In FIG. 9, k on the x-axis (frequency axis) is the carrier index, and i on the y-axis (time axis) is the symbol index. Solid dots represent the scattered pilot, and open circles represent the data carrier containing control information (TPS (transmission parameter signalling) in DVB-T, TMCC (transmission multiplexing configuration control) in ISDB-T) and additional information (AC (auxiliary channel) in ISDB-T).

As shown in FIG. 9, the scattered pilot is inserted at every 12th carrier in each symbol with the location shifted three carriers in each symbol. The scattered pilot is also modulated using a pseudo random binary sequence; the amplitude and phase are determined only by the carrier index k, and are independent of the symbol index i.

Figure 10:
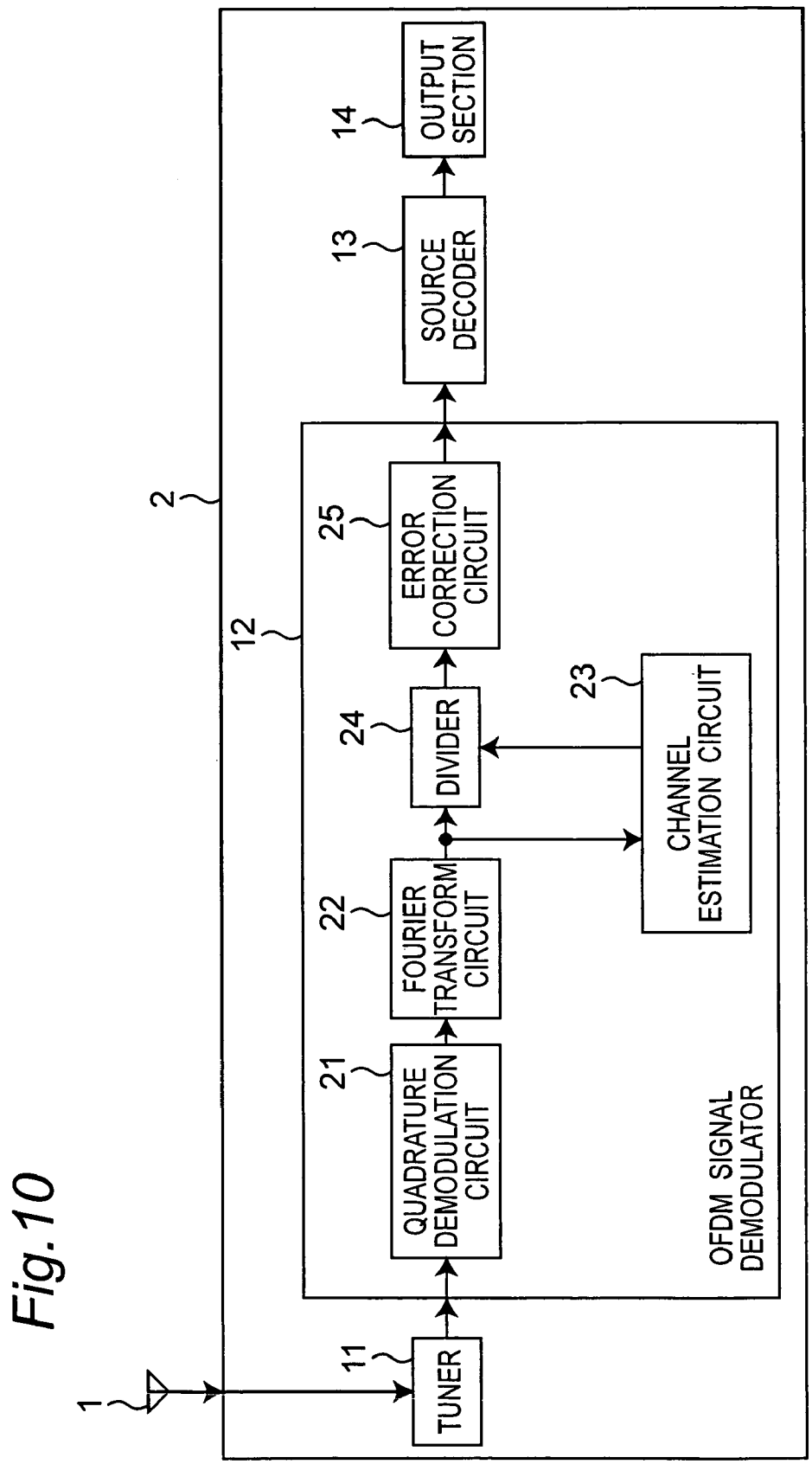
FIG. 10 is a schematic block diagram of an OFDM signal receiving apparatus according to the present invention.
Figure 11:
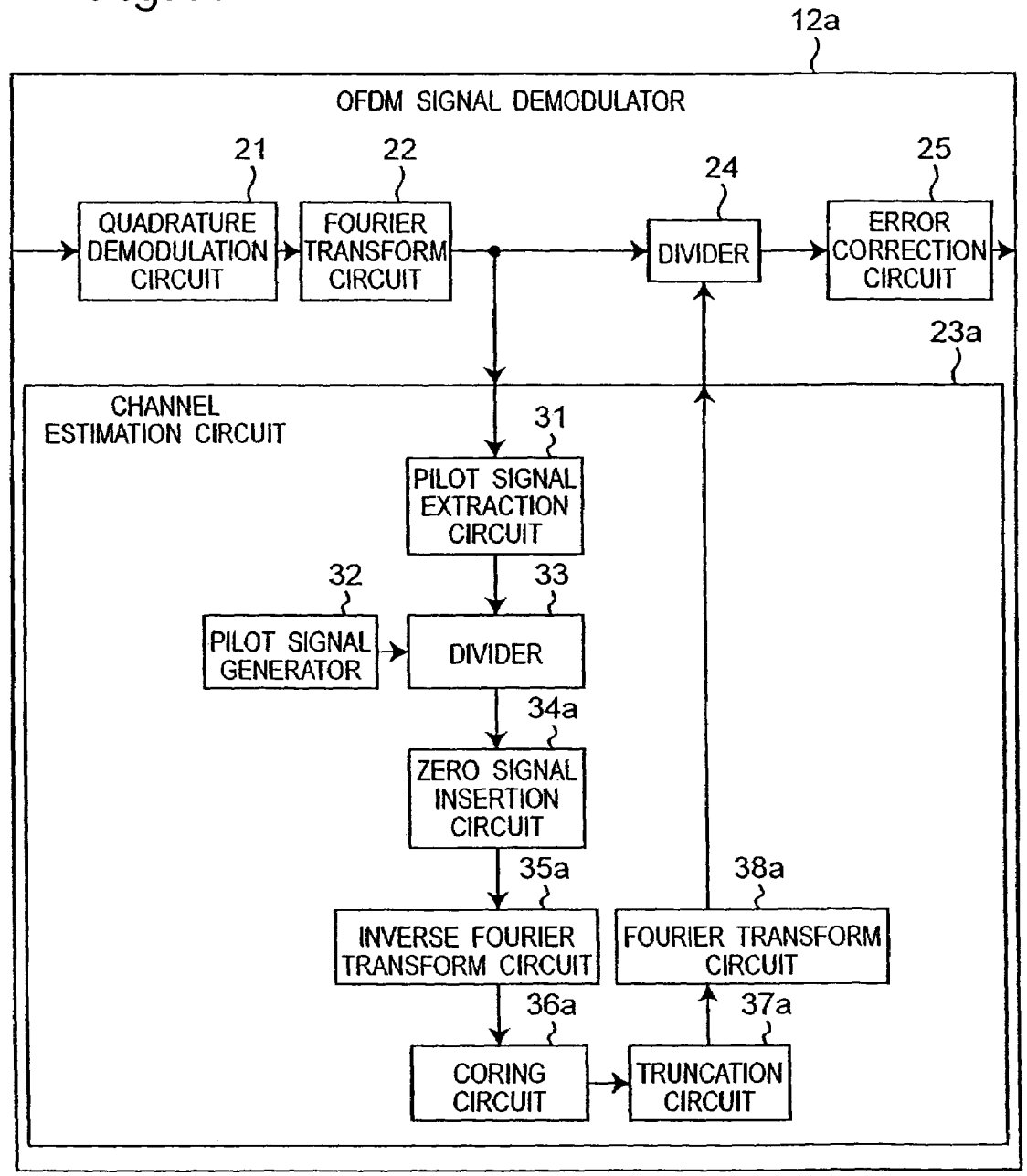
FIG. 11 is a schematic block diagram of an OFDM signal demodulator according to the prior art.
Figure 12A:
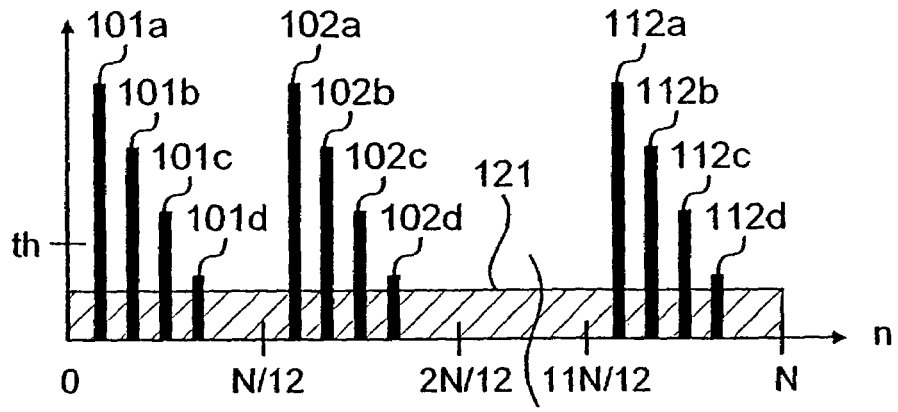
FIG. 12 schematically illustrates the operation of an OFDM signal demodulator according to the prior art.
Figure 12B:
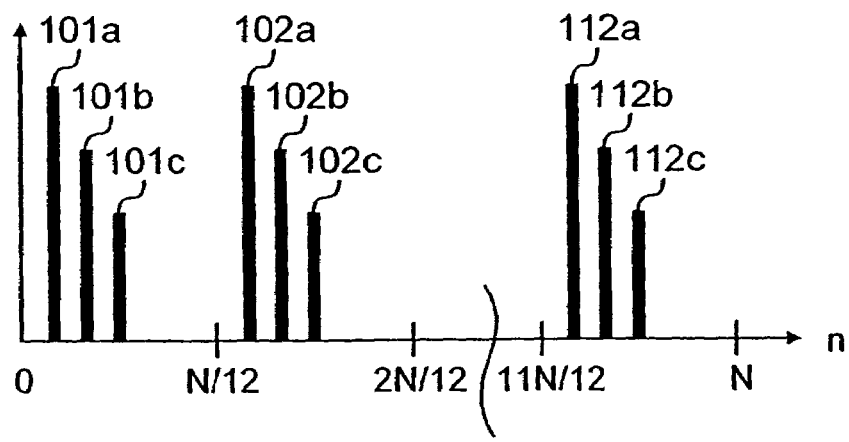
Figure 12C:
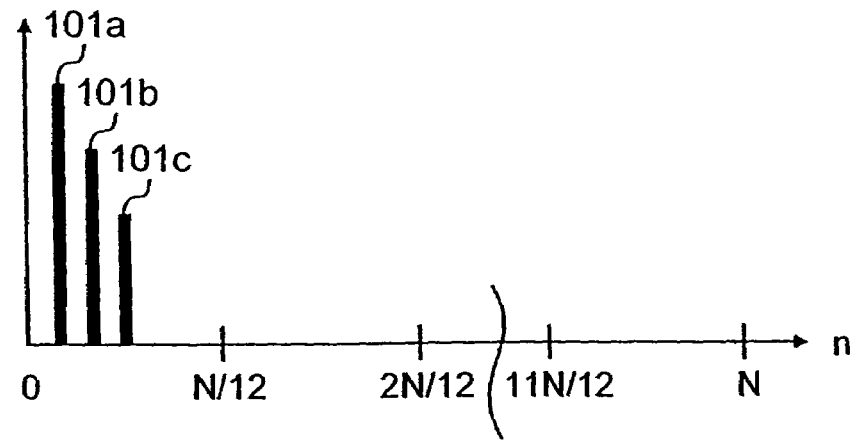

FIG. 10 is a block diagram of an OFDM signal receiving apparatus according to the present invention.

Referring to FIG. 10, a signal received by the antenna 1 is supplied to the tuner 11 in the OFDM signal receiver 2. The tuner 11 extracts the OFDM signal containing the desired service from the reception signal supplied from the antenna, frequency converts the signal from the RF (radio frequency) band to the IF (intermediate frequency) band, and adjusts the gain, and then supplies the resulting output to an OFDM signal demodulator 12.

The OFDM signal demodulator 12 demodulates the tuner 11 output to restore the transmitted digital data, applies an error correction and decoding process to correct transmission error caused by noise, for example, added to the signal on the channel, and then supplies the resulting output to the source decoder 13.

The source decoder 13 separates the output from the OFDM signal demodulator 12 into video and audio data, applies a data decompression process, and supplies the resulting output to the output section 14. The output section 14 then provides the desired service to the user by, for example, presenting video information from the source decoder 13 output on a display device such as a CRT (cathode ray tube) and outputting the audio information through speakers, or outputs the output from the source decoder 13 to an external device.

Inside the OFDM signal demodulator 12, an quadrature demodulation circuit 21 frequency converts the tuner output from the IF band to the baseband by quadrature demodulation of the output from the tuner 11, converts real number signals to complex number signals having an I (In phase) component and a Q (Quadrature phase) component, and supplies the resulting output to the Fourier transform circuit 22.

The Fourier transform circuit 22 converts the output of the quadrature demodulation circuit 21 from the time domain to the frequency domain by Fourier transform, and supplies the output to the channel estimation circuit 23 and the first input of the divider 24.

The channel estimation circuit 23 estimates the frequency response of the channel from the pilot signal contained in the output of the Fourier transform circuit 22, and supplies the output to the second input of the divider 24.

The divider 24 then divides the output of the Fourier transform circuit 22 by the output of the channel estimation circuit 23 to compensate for amplitude and phase distortion introduced to the signal along the channel, and outputs to the error correction circuit 25.

The error correction circuit 25 applies an error correction process to the divider 24 output, and the output from the error correction circuit 25 is supplied as the output of the OFDM signal demodulator 12 to the source decoder 13. Error correction by this error correction circuit 25 could include de-mapping, deinterleaving, Viterbi decoding, energy dispersion, or Reed-Solomon decoding, for example.

Preferred embodiments of the present invention are described below with reference to the accompanying figures.

Embodiment 1

Figure 1:
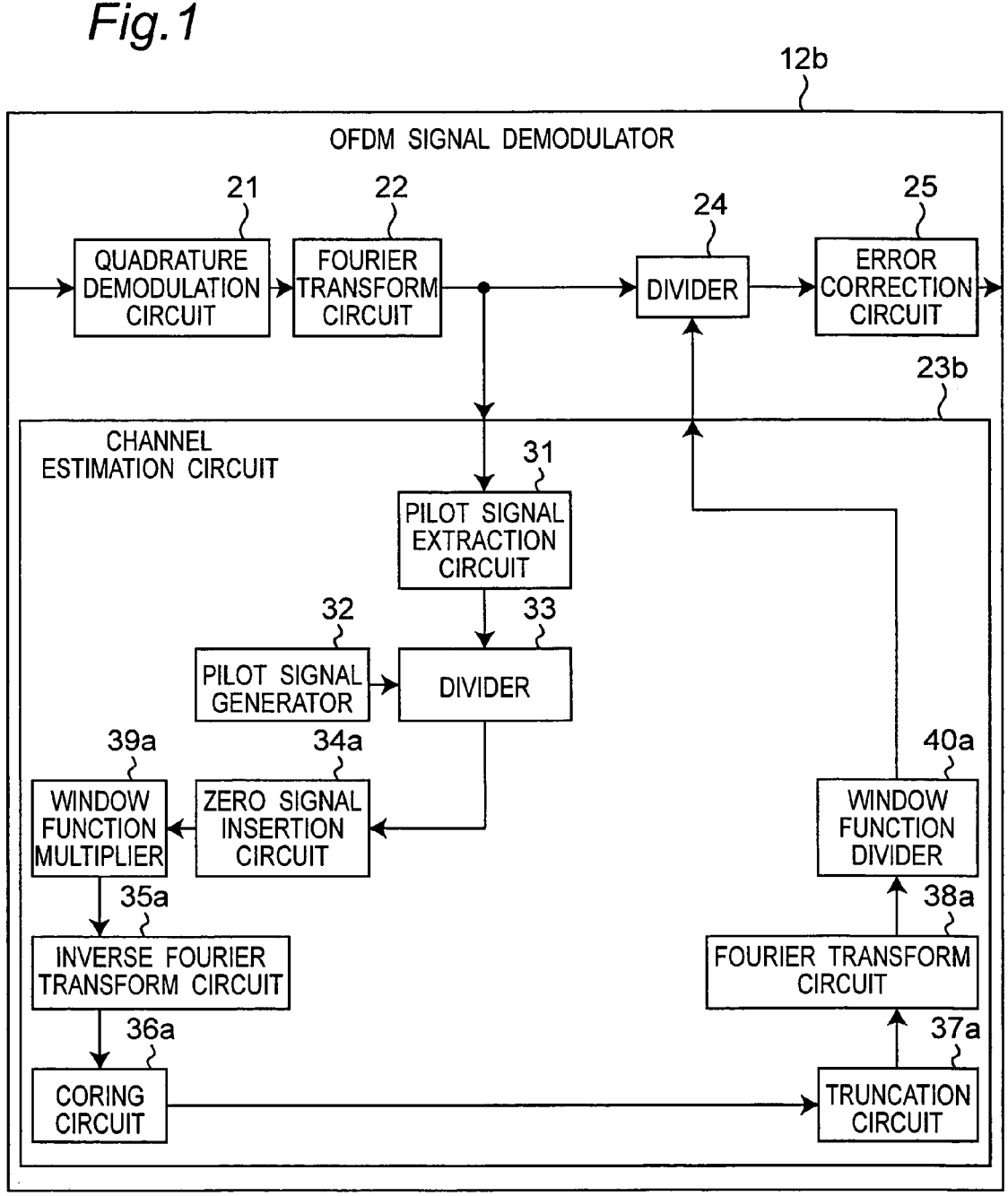
FIG. 1 is a schematic block diagram of an OFDM signal demodulator in a first embodiment of the present invention.

FIG. 1 is a block diagram of an OFDM signal demodulator 12b in a first embodiment of the present invention. This OFDM signal demodulator 12b is included in the OFDM signal receiver 2 shown in FIG. 10.

Referring to FIG. 1, the quadrature demodulation circuit 21 frequency converts the IF band to the baseband by quadrature demodulation of the output from the tuner 11 in FIG. 10, converts real number signals to complex number signals of I components and Q components, and outputs the result to the Fourier transform circuit 22.

The Fourier transform circuit 22 converts the output of the quadrature demodulation circuit 21 from the time domain to the frequency domain by Fourier transform, and outputs the result to the channel estimation circuit 23b and the first input of the divider 24.

The channel estimation circuit 23b estimates the frequency response of the channel from the pilot signal contained in the output of the Fourier transform circuit 22, and the output of the estimation circuit 23b is then supplied to the second input of the divider 24.

The divider 24 then compensates for amplitude and phase distortion introduced to the signal on the channel by dividing the output of the Fourier transform circuit 22 by the output of the channel estimation circuit 23b. The divider 24 outputs the result to the error correction circuit 25.

The error correction circuit 25 applies error correction to the divider 24 output, and the output from the error correction circuit 25 is supplied as the output of the OFDM signal demodulator 12 to the source decoder 13 shown in FIG. 10. Error correction by this error correction circuit 25 could include de-mapping, deinterleaving, Viterbi decoding, energy dispersion, or Reed-Solomon decoding, for example.

In the channel estimation circuit 23b shown in FIG. 1, the pilot signal extraction circuit 31 extracts the pilot signal contained in the output of the Fourier transform circuit 22, and outputs the result to the first input of a divider 33.

The pilot signal generator 32 generates a pilot signal of known amplitude and phase synchronized to the pilot signal extraction circuit 31, and outputs the resulting pilot signal to the second input of the divider 33.

The divider 33 then divides the output of the pilot signal extraction circuit 31 by the output of the pilot signal generator 32 to acquire the frequency response of the channel sampled at the pilot signal interval, and then outputs the result to the zero signal insertion circuit 34a.

The zero signal insertion circuit 34a inserts a zero signal to the output of the divider 33, and outputs the result to a window function multiplier 39a.

The window function multiplier 39a multiplies the output of the zero signal insertion circuit 34a by a window function, and outputs the result to the inverse Fourier transform circuit 35a.

The inverse Fourier transform circuit 35a converts the frequency response output from the window function multiplier 39a to an impulse response by inverse Fourier transform, and outputs the result to the coring circuit 36a.

The coring circuit 36a replaces data equal to or less than a specified threshold value in the output of the inverse Fourier transform circuit 35a with a zero signal, and outputs the result to the truncation circuit 37a.

The truncation circuit 37a truncates the coring circuit output to a specified length and replaces other data with a zero signal to remove aliasing components (due to the frequency response, which is the input to the inverse Fourier transform circuit 35a, being sampled at the pilot signal period). The truncation circuit 37a outputs the result to the window function divider 40a.

The window function divider 40a divides the output of the Fourier transform circuit 38a by the window function applied by the window function multiplier 39a.

The output of the window function divider 40a is then supplied as the output of the channel estimation circuit 23b to the second input of the divider 24.

With this embodiment of the invention the frequency response acquired by the Fourier transform circuit 38a applying Fourier transform to the output of the truncation circuit 37a is thus not only interpolated, but estimation error due to noise is reduced by the operation of the coring circuit 36a.

In addition, fewer signal components are replaced by zero signals in the coring circuit 36a because side lobe components of the impulse response output from the inverse Fourier transform circuit 35a are suppressed by the window function multiplier 39a applying a window function. Distortion in the frequency response acquired as the output of the Fourier transform circuit 38a can thus be reduced.

Note that in FIG. 1 the window function multiplier 39a is located downstream of the zero signal insertion circuit 34a, but the window function multiplier 39a could be upstream of the zero signal insertion circuit 34a.

Embodiment 2

Figure 2:
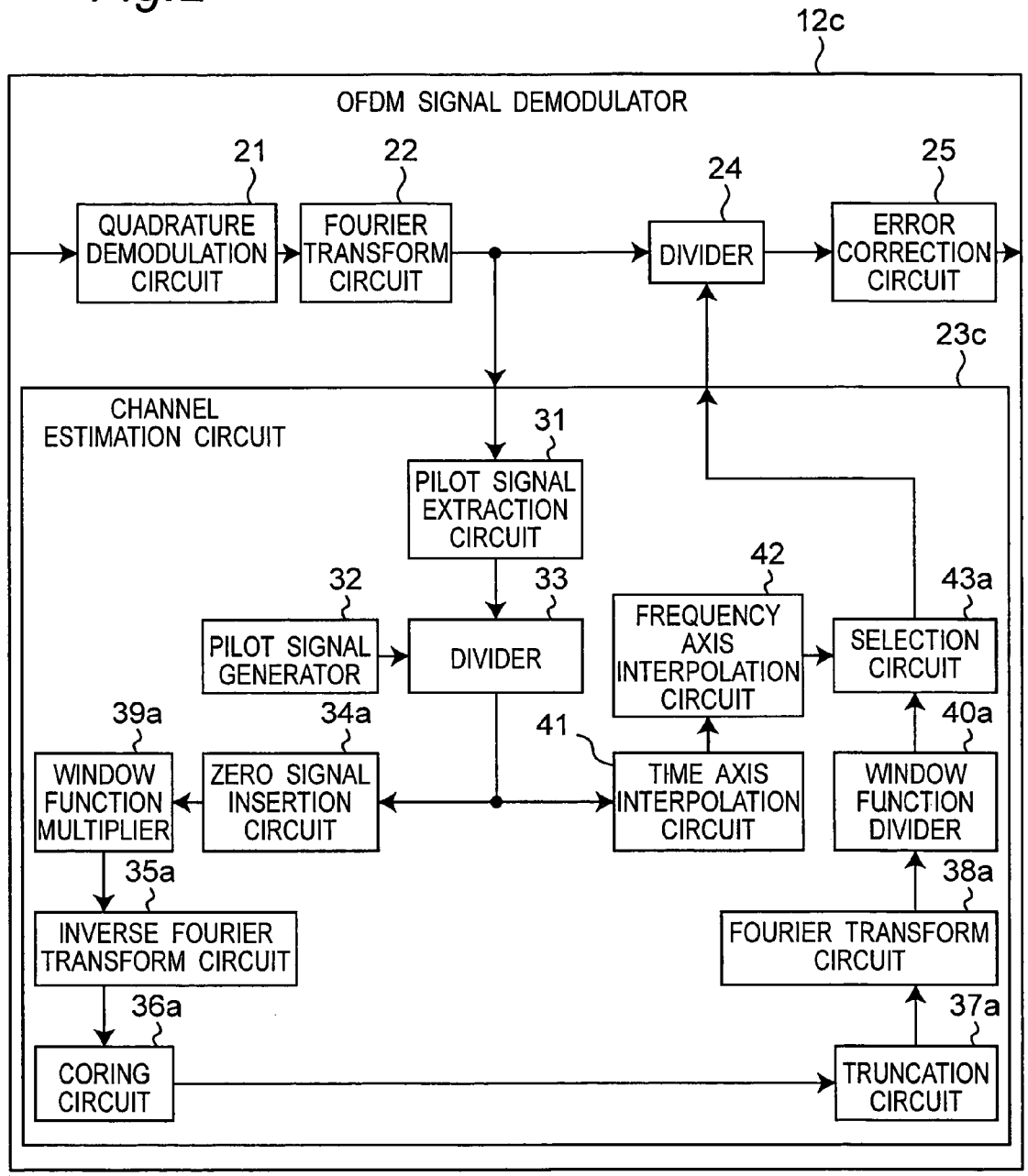
FIG. 2 is a schematic block diagram of an OFDM signal demodulator in a second embodiment of the present invention.

FIG. 2 is a block diagram of an OFDM signal demodulator 12c in a second embodiment of the present invention. This OFDM signal demodulator 12c is included in the OFDM signal receiver 2 shown in FIG. 10. Like elements are identified by like reference numerals in FIG. 2 and FIG. 1, and further description thereof is omitted below.

Referring to FIG. 2, the output of the divider 33 is supplied to the zero signal insertion circuit 34a and time axis interpolation circuit 41. The time axis interpolation circuit 41 interpolates the frequency response (sampled at the pilot signal period) output from the divider 33 on the time axis, and outputs the result to the frequency axis interpolation circuit 42.

The frequency axis interpolation circuit 42 interpolates the frequency response that was interpolated on the time axis by the time axis interpolation circuit 41 on the frequency axis, and outputs the result to the first input of selection circuit 43a. The window function divider 40a outputs to the second input of the selection circuit 43a.

The selection circuit 43a selects the frequency response output from the window function divider 40a for carriers within a specific range of the signal band center, selects the frequency response output from the frequency axis interpolation circuit 42 for the remaining carriers near the signal band edges, and outputs the result to as the output of the channel estimation circuit 23c to the second input of the divider 24.

Estimation error for the overall signal band can thus be reduced as a result of the selection circuit 43a selecting the frequency response in which estimation error caused by noise has been reduced by the operation from the zero signal insertion circuit 34a to the window function divider 40a for carriers near the signal band center, and selecting the frequency response interpolated by the time axis interpolation circuit 41 and frequency axis interpolation circuit 42 for carriers near the signal band edges where the frequency response is easily distorted.

Note that in FIG. 2 the window function multiplier 39a is located downstream of the zero signal insertion circuit 34a, but the window function multiplier 39a could be upstream of the zero signal insertion circuit 34a. In addition, this embodiment of the invention can also be applied to implementations not having a window function multiplier 39a and window function divider 40a.

Embodiment 3

Figure 3:
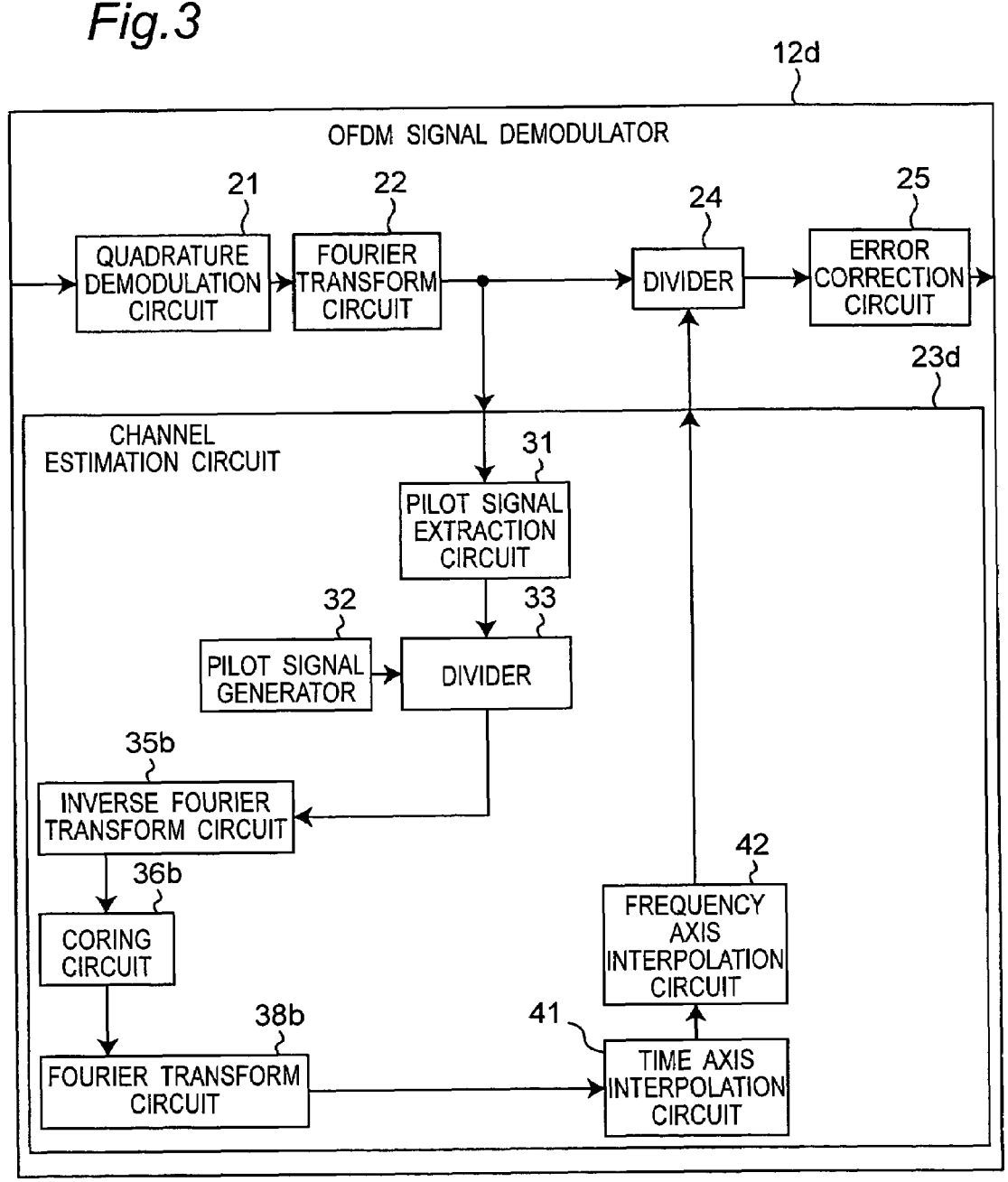
FIG. 3 is a schematic block diagram of an OFDM signal demodulator in a third embodiment of the present invention.

FIG. 3 is a block diagram of an OFDM signal demodulator 12d in a third embodiment of the present invention. This OFDM signal demodulator 12d is included in the OFDM signal receiver 2 shown in FIG. 10. Like elements are identified by like reference numerals in FIG. 3 and FIG. 1, and further description thereof is omitted below.

In FIG. 3 the output of the divider 33 is supplied to the inverse Fourier transform circuit 35b. inverse Fourier transform circuit 35b converts the frequency response output from the divider 33 to an impulse response by an inverse Fourier transform, and outputs the result to coring circuit 36b.

The coring circuit 36b applies a coring process to the output from the inverse Fourier transform circuit 35b, and outputs the result to Fourier transform circuit 38b.

The Fourier transform circuit 38b converts the impulse response from the coring circuit 36b to a frequency response by Fourier transform, and outputs the result to the time axis interpolation circuit 41.

The time axis interpolation circuit 41 interpolates the frequency response (sampled at the pilot signal period) output from the Fourier transform circuit 38b on the time axis, and outputs the result to the frequency axis interpolation circuit 42.

The frequency axis interpolation circuit 42 interpolates the frequency response that was interpolated on the time axis by the time axis interpolation circuit 41 on the frequency axis, and outputs the result as the output of the channel estimation circuit 23d to the second input of the divider 24.

This embodiment of the invention reduces the data processed by the inverse Fourier transform circuit 35b and Fourier transform circuit 38b as a result of not inserting zeroes before the inverse Fourier transform circuit 35b, and can therefore reduce the circuit scale needed for a hardware implementation and the number of operations performed in a software implementation.

Figure 6:
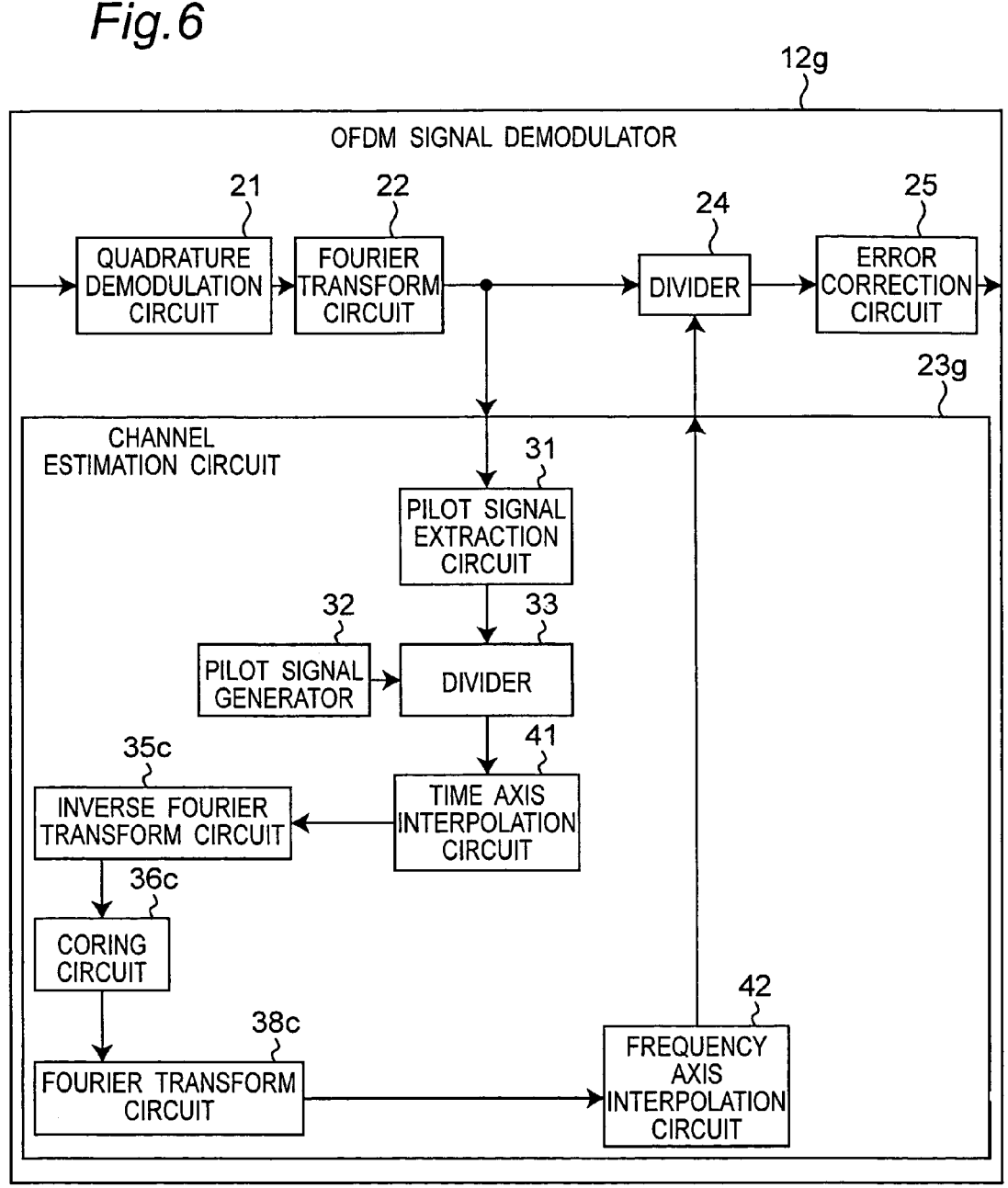
FIG. 6 is a schematic block diagram showing an alternative configuration of an OFDM signal demodulator in a third embodiment of the present invention.

Note that the time axis interpolation circuit 41 is located downstream of the Fourier transform circuit 38b in FIG. 3, but the time axis interpolation circuit 41 could be located before the inverse Fourier transform circuit 35c as shown in FIG. 6.

Embodiment 4

Figure 4:
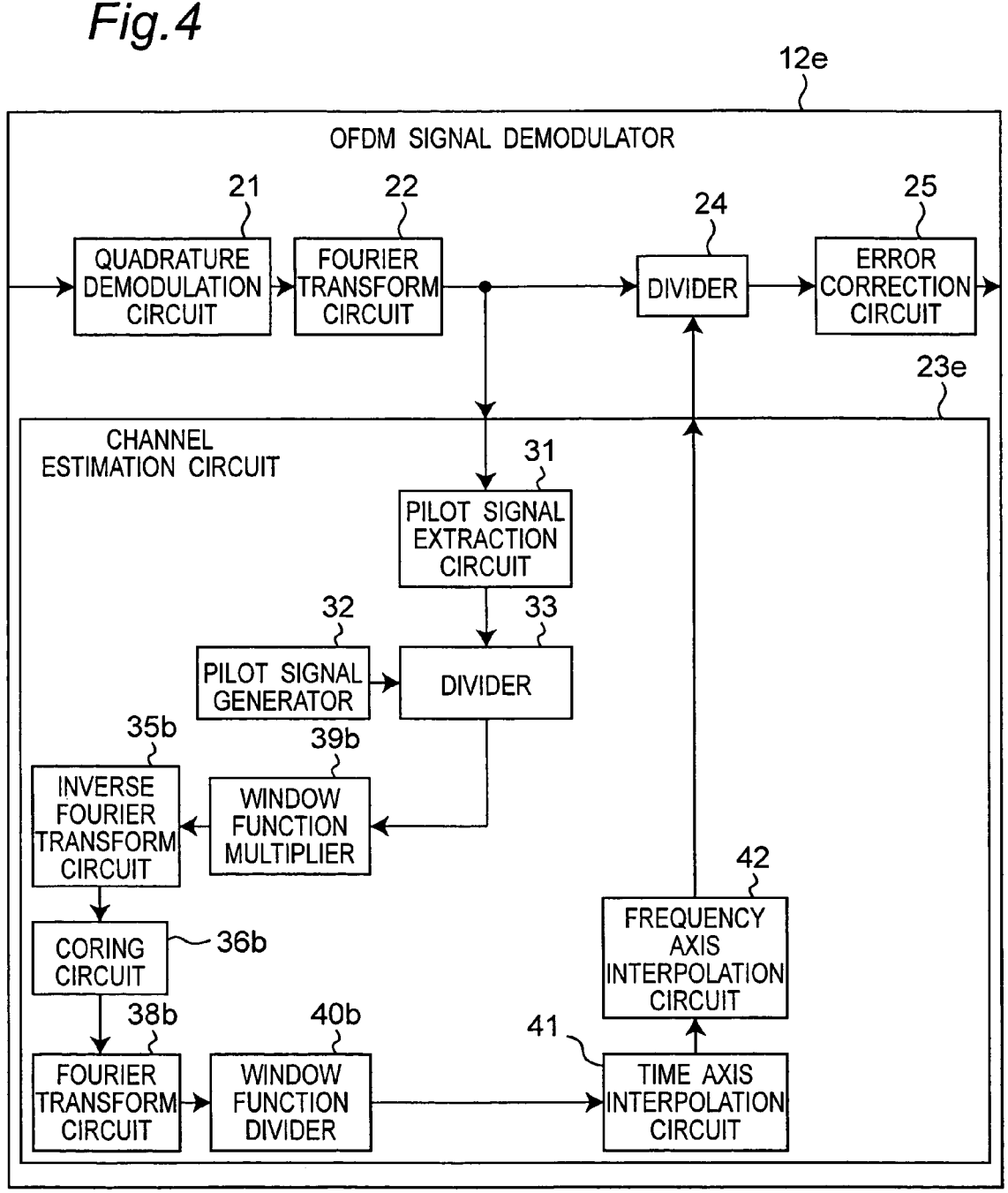
FIG. 4 is a schematic block diagram of an OFDM signal demodulator in a fourth embodiment of the present invention.

FIG. 4 is a block diagram of an OFDM signal demodulator 12e in a fourth embodiment of the present invention. This OFDM signal demodulator 12e is included in the OFDM signal receiver 2 shown in FIG. 10. Like elements are identified by like reference numerals in FIG. 4 and FIG. 3, and further description thereof is omitted below.

In FIG. 4 the output of the divider 33 is supplied to the window function multiplier 39b. The window function multiplier 39b multiplies the output of the divider 33 with a window function, and outputs the result to inverse Fourier transform circuit 35b.

The output of the Fourier transform circuit 38b is supplied to the window function divider 40b. The window function divider 40b divides the output of the Fourier transform circuit 38b by the window function applied by the window function multiplier 39b, and outputs the result to the time axis interpolation circuit 41.

This embodiment of the invention reduces the data processed by the inverse Fourier transform circuit 35b and Fourier transform circuit 38b as a result of not inserting zeroes before the inverse Fourier transform circuit 35b, and can therefore reduce the circuit scale needed for a hardware implementation and the number of operations performed in a software implementation.

Furthermore, the number of signal components replaced by zero signals in the coring circuit 36b is reduced because the side lobe components of the impulse response output from the inverse Fourier transform circuit 35b are suppressed as a result of the window function multiplier 39b applying a window function. Distortion of the frequency response acquired as the output of the Fourier transform circuit 38b can thus be reduced.

Figure 7:
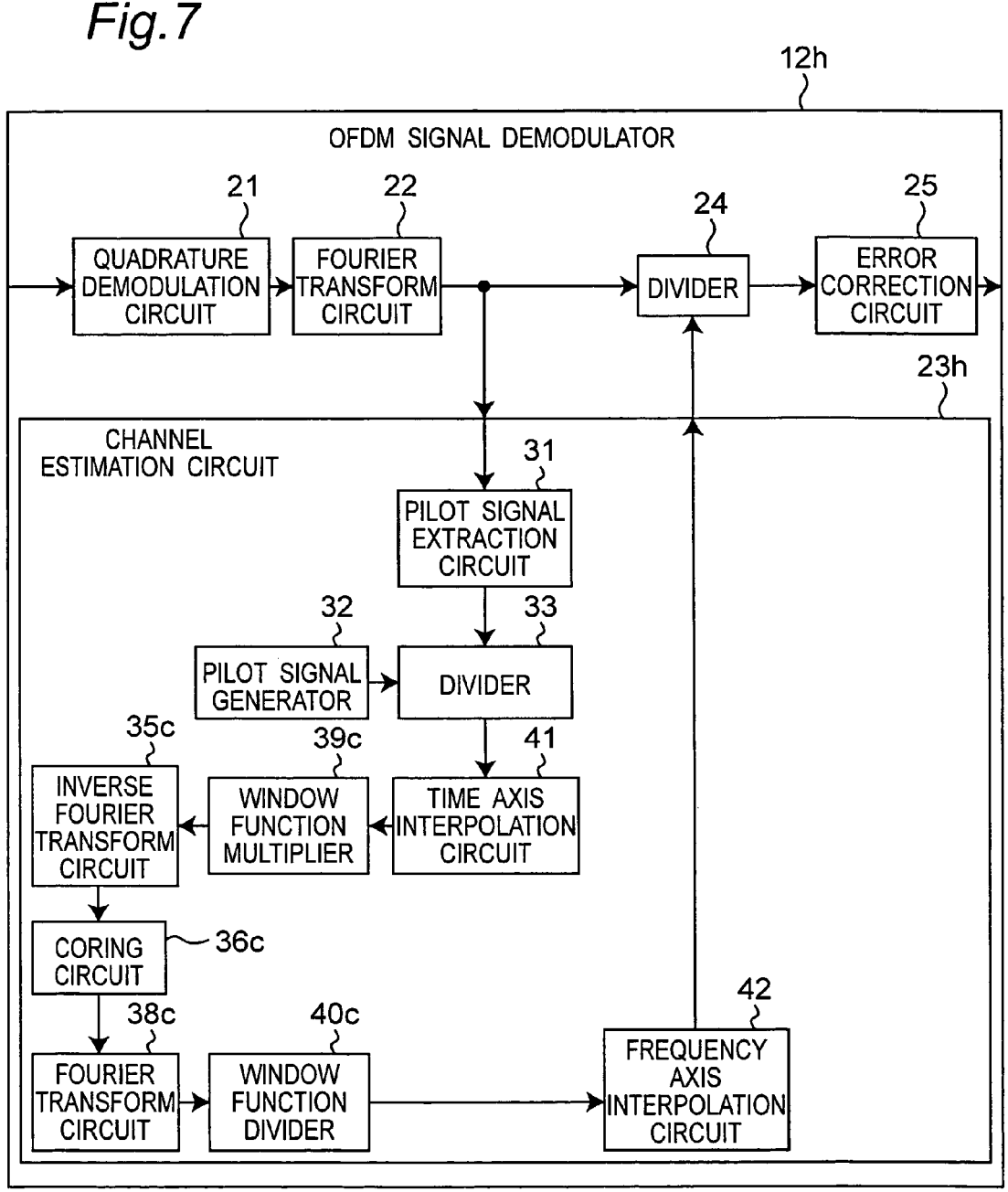
FIG. 7 is a schematic block diagram showing an alternative configuration of an OFDM signal demodulator in a fourth embodiment of the present invention.

Note that the time axis interpolation circuit 41 is disposed downstream of the window function divider 40b in FIG. 4, but the time axis interpolation circuit 41 could be located before the window function multiplier 39c as shown in FIG. 7.

Embodiment 5

Figure 5:
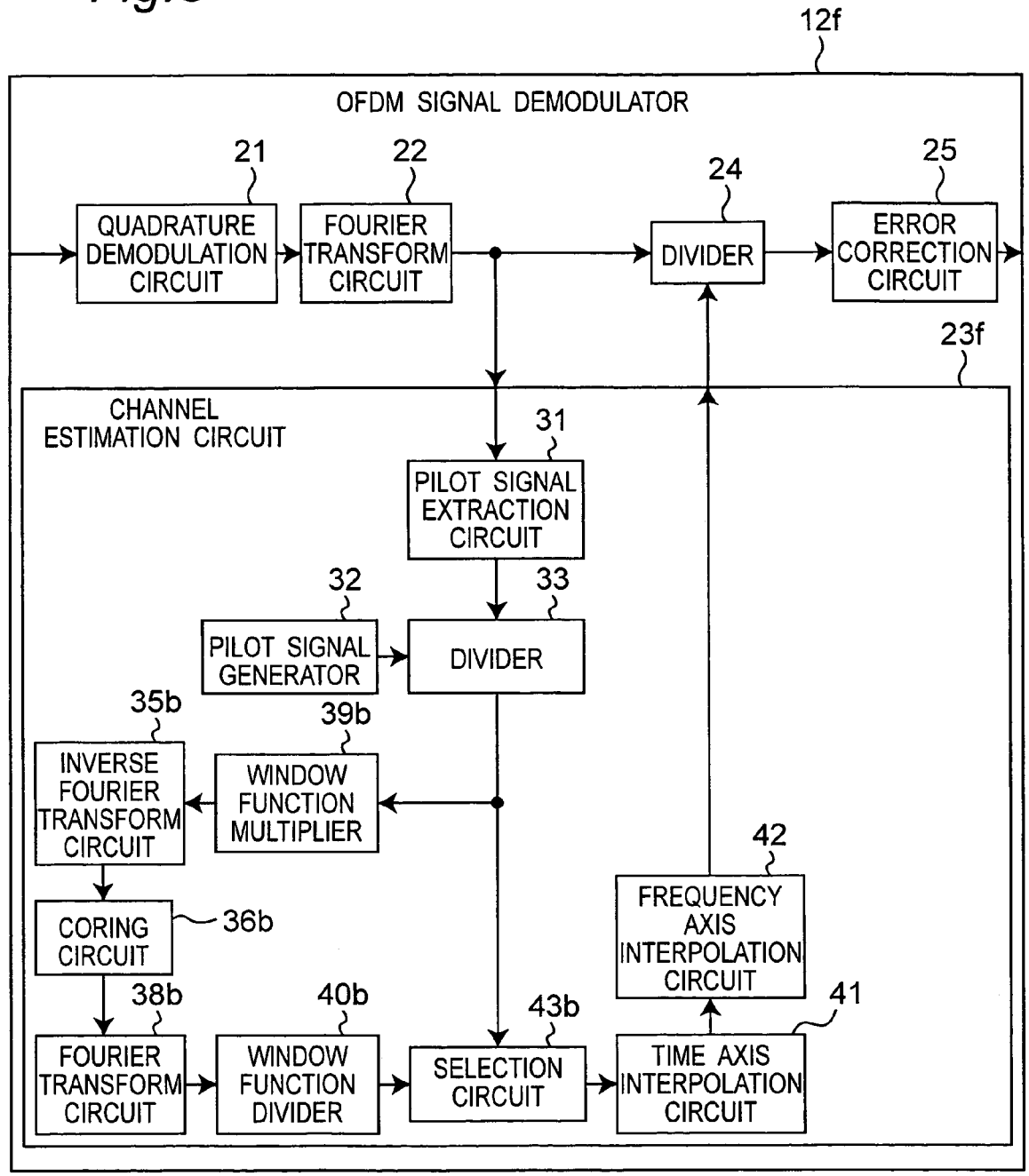
FIG. 5 is a schematic block diagram of an OFDM signal demodulator in a fifth embodiment of the present invention.

FIG. 5 is a block diagram of an OFDM signal demodulator 12f in a fifth embodiment of the present invention. This OFDM signal demodulator 12f is included in the OFDM signal receiver 2 shown in FIG. 10. Like elements are identified by like reference numerals in FIG. 5 and FIG. 4, and further description thereof is omitted below.

In FIG. 5 the output of the divider 33 is supplied to the window function multiplier 39b and the first input of the selection circuit 43b. The output of the window function divider 40b is supplied to the second input of the selection circuit 43b.

The selection circuit 43b selects the frequency response output from the window function divider 40b for carriers within a specific range of the signal band center, selects the frequency response output from the divider 33 for the remaining carriers near the signal band edges, and outputs the result to the time axis interpolation circuit 41.

This embodiment of the invention reduces the data processed by the inverse Fourier transform circuit 35b and Fourier transform circuit 38b as a result of not inserting zeroes before the inverse Fourier transform circuit 35b, and can therefore reduce the circuit scale needed for a hardware implementation and the number of operations performed in a software implementation.

Furthermore, estimation error for the overall signal band can be reduced as a result of the selection circuit 43b selecting the frequency response in which estimation error caused by noise has been reduced by the operation from the window function multiplier 39b to the window function divider 40b for carriers near the signal band center, and selecting the frequency response acquired by the divider 33 for carriers near the signal band edges where the frequency response is easily distorted.

Note that this embodiment of the invention can also be applied to implementations not having a window function multiplier 39b and window function divider 40b.

Figure 8:
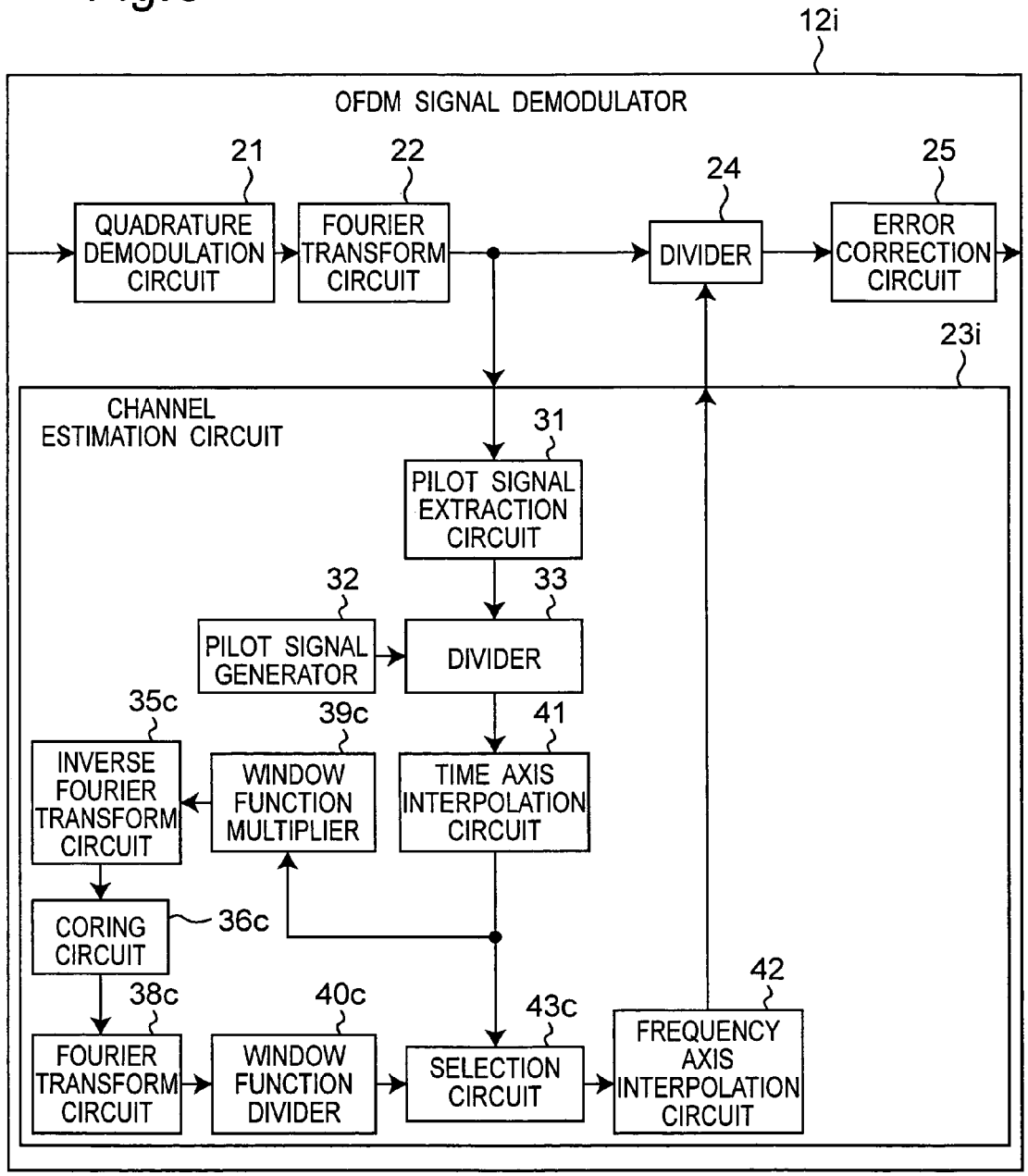
FIG. 8 is a schematic block diagram showing an alternative configuration of an OFDM signal demodulator in a fifth embodiment of the present invention.

Furthermore, the time axis interpolation circuit 41 is located after the selection circuit 43b in FIG. 5, but the time axis interpolation circuit 41 could be located upstream of the window function multiplier 39c and selection circuit 43c as shown in FIG. 8.

Embodiment 6

Figure 13:
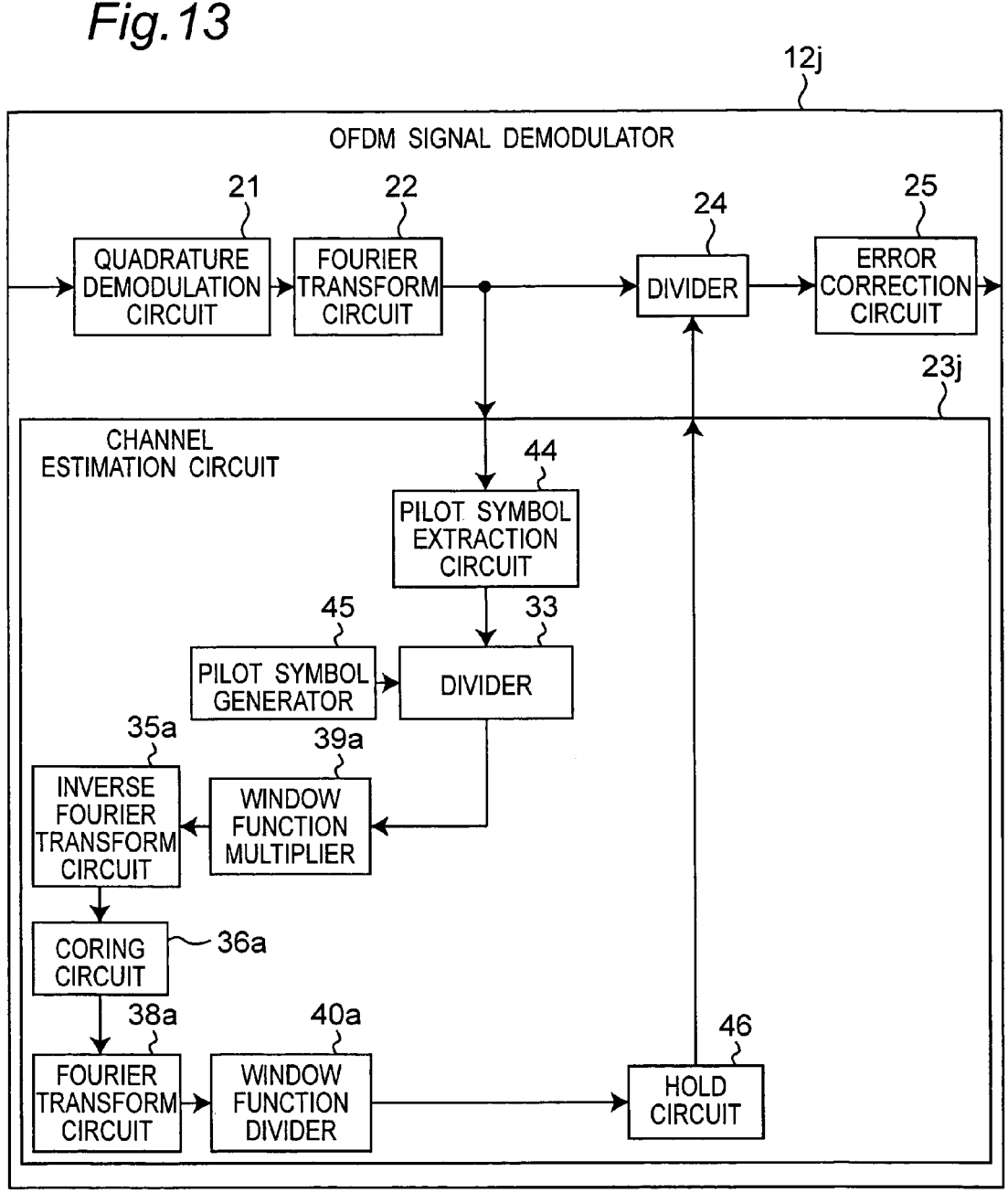
FIG. 13 is a schematic block diagram of an OFDM signal demodulator in a sixth embodiment of the present invention.

FIG. 13 is a block diagram of an OFDM signal demodulator 12j in a sixth embodiment of the present invention. This OFDM signal demodulator 12j is included in the OFDM signal receiver 2 shown in FIG. 10.

This embodiment of the invention applies to wireless LAN (local area network) systems that transmit finite length frames and send a pilot symbol containing the known amplitude and phase of all carriers in the preamble such as defined in IEEE (Institute of Electrical and Electronics Engineering) 802.11a, and to systems such as the European terrestrial digital audio broadcasting (DAB) system that transmit continuous frames and insert a pilot symbol of known amplitude and phase for all carriers every frame period.

Referring to FIG. 13, the quadrature demodulation circuit 21 frequency converts the IF band to the baseband by quadrature demodulation of the output from the tuner 11 in FIG. 10, converts real number signals to complex number signals of I components and Q components, and outputs the result to the Fourier transform circuit 22.

The Fourier transform circuit 22 converts the output of the quadrature demodulation circuit 21 from the time domain to the frequency domain by Fourier transform, and outputs the result to the channel estimation circuit 23j and the first input of the divider 24.

The channel estimation circuit 23j estimates the frequency response of the channel from the pilot symbol contained in the output of the Fourier transform circuit 22, and the output of the estimation circuit 23j is then supplied to the second input of the divider 24.

The divider 24 then compensates for amplitude and phase distortion introduced to the signal on the channel by dividing the output of the Fourier transform circuit 22 by the output of the channel estimation circuit 23j. The divider 24 outputs the result to the error correction circuit 25.

The error correction circuit 25 applies error correction to the divider 24 output, and the output from the error correction circuit 25 is supplied as the output of the OFDM signal demodulator 12j to the source decoder 13 shown in FIG. 10. Error correction by this error correction circuit 25 could include de-mapping, deinterleaving, Viterbi decoding, energy dispersion, or Reed-Solomon decoding, for example.

In the channel estimation circuit 23j shown in FIG. 13, the pilot symbol extraction circuit 44 extracts the pilot symbol contained in the output of the Fourier transform circuit 22, and outputs the result to the first input of a divider 33.

The pilot symbol generator 45 generates a pilot symbol of known amplitude and phase for all carriers synchronized to the pilot symbol extraction circuit 44, and outputs the result to the second input of the divider 33.

The divider 33 then divides the output of the pilot symbol extraction circuit 44 by the output of the pilot symbol generator 45 to acquire the frequency response of the channel, and then outputs the result to the window function multiplier 39a.

The window function multiplier 39a multiplies the output of the divider 33 by a window function, and outputs the result to inverse Fourier transform circuit 35a.

The inverse Fourier transform circuit 35a converts the frequency response output from the window function multiplier 39a to an impulse response by inverse Fourier transform, and outputs the result to the coring circuit 36a.

The coring circuit 36a replaces data equal to or less than a specified threshold value in the output of the inverse Fourier transform circuit 35a with a zero signal, and outputs the result to the Fourier transform circuit 38a.

The Fourier transform circuit 38a converts the impulse response output from the coring circuit 36a to a frequency response by Fourier transform, and outputs the result to the window function divider 40a.

The window function divider 40a divides the output of the Fourier transform circuit 38a by the window function applied by the window function multiplier 39a, and outputs the result to hold circuit 46.

This hold circuit 46 holds the output of the window function divider 40a until the end of the frame in a system such as IEEE 802.11a using finite length frames and transmitting the pilot symbol in the preamble, or for the frame period in a system such as DAB using continuous frames with the pilot symbol transmitted each frame period. The output of the hold circuit 46 is then supplied as the output of the channel estimation circuit 23j to the second input of the divider 24.

The operation of the coring circuit 36a in this embodiment of the invention thus reduces estimation error due to noise in the frequency response acquired by the Fourier transform applied by the Fourier transform circuit 38a to the output of the coring circuit 36a.

Furthermore, fewer signal components are replaced by zero signals in the coring circuit 36a because side lobe components of the impulse response output from the inverse Fourier transform circuit 35a are suppressed by the window function multiplier 39a applying a window function. Distortion in the frequency response acquired as the output of the Fourier transform circuit 38a can thus be reduced.

In systems such as IEEE 802.11a that transmit a pilot signal of known amplitude and phase using a specific carrier in the frame period, the hold circuit 46 could compensate for variation in amplitude and phase using the pilot signal.

Embodiment 7

Figure 14:
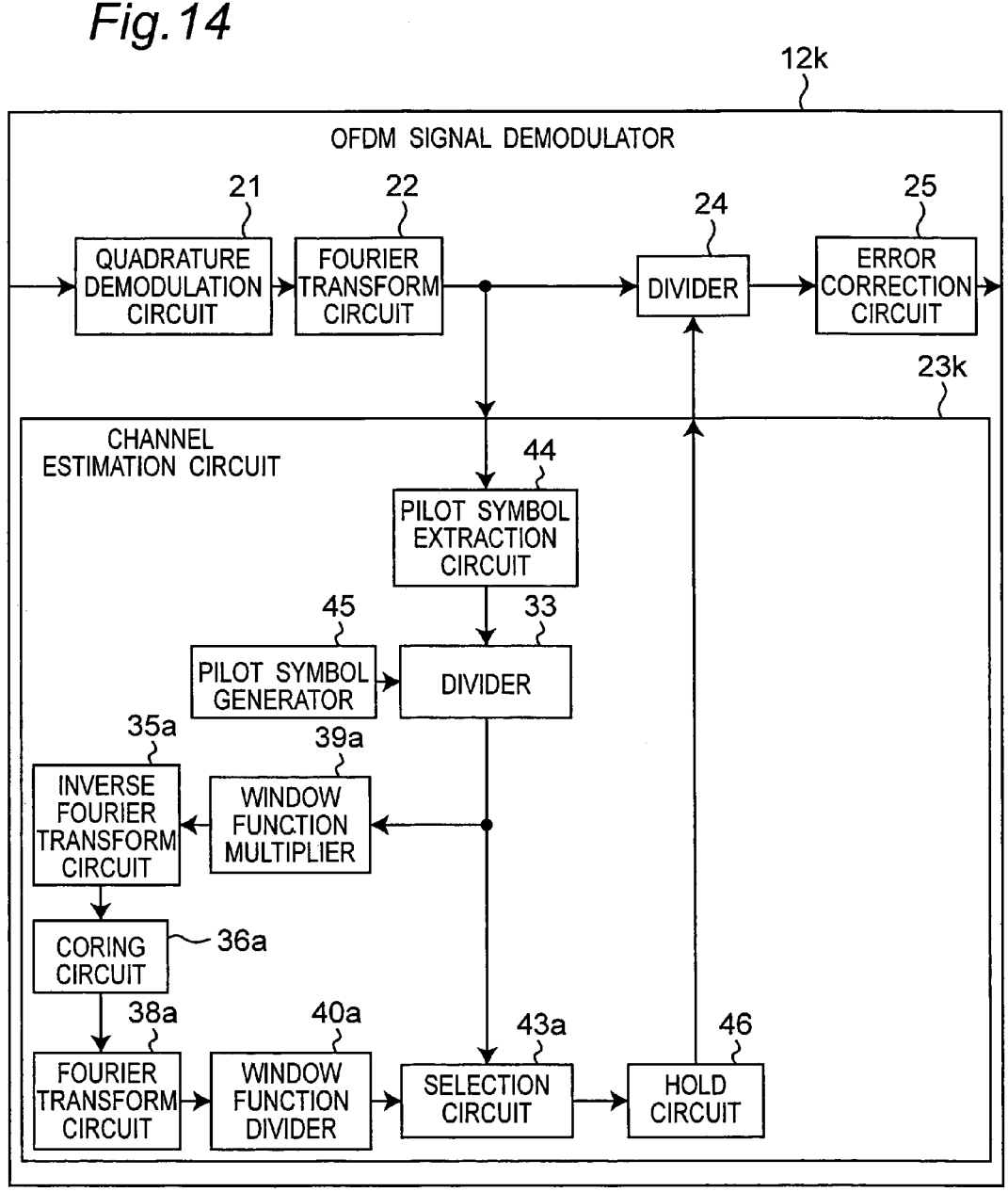
FIG. 14 is a schematic block diagram of an OFDM signal demodulator in a seventh embodiment of the present invention.

FIG. 14 is a block diagram of an OFDM signal demodulator 12k in a seventh embodiment of the present invention. This OFDM signal demodulator 12k is included in the OFDM signal receiver 2 shown in FIG. 10. Like elements are identified by like reference numerals in FIG. 14 and FIG. 13, and further description thereof is omitted below.

In FIG. 14 the output of the divider 33 is supplied to the window function multiplier 39a and the first input of the selection circuit 43a. The output of the window function divider 40a is supplied to the second input to the selection circuit 43a.

The selection circuit 43a selects the frequency response output from the window function divider 40a for carriers within a specific range of the signal band center, selects the frequency response output from the divider 33 for the remaining carriers near the signal band edges, and outputs the result to the hold circuit 46.

Estimation error for the overall signal band can thus be reduced as a result of the selection circuit 43a selecting the frequency response in which estimation error caused by noise has been reduced by the operation from the window function multiplier 39a to the window function divider 40a for carriers near the signal band center, and selecting the frequency response calculated by the divider 33 for carriers near the signal band edges where the frequency response is easily distorted.

Note that this embodiment of the invention can also be applied to implementations not having a window function multiplier 39a and window function divider 40a.

The threshold values used in the coring circuits 36a, 36b, 36c in the foregoing embodiments can be a fixed value or can be appropriately controlled. Methods of appropriately controlling this threshold value include controlling the threshold value according to the impulse response, or according to the noise level.

Furthermore, the window function applied by the window function multipliers 39a, 39b, 39c and the window function dividers 40a, 40b, 40c in the foregoing embodiments is preferably a function, such as a Hamming window, Hanning window, or Blackman window, that can suppress side lobe components.

The foregoing embodiments are described using by way of example transmission systems such as DVB-T or ISDB-T that include a pilot signal dispersed in the signal band, a transmission system such as IEEE 802.11a using finite length frames and transmit the pilot symbol in the preamble, or a transmission system such as DAB using continuous frames with the pilot symbol transmitted each frame period, but other transmission methods that send a pilot signal of known amplitude and phase could be used.

Furthermore, although not shown in the figures, the position of the AD (analog to digital) converter used for digital signal processing in the OFDM signal demodulator is not specifically related to the operating principle of the present invention, and the same principle can be applied regardless of where the AD converter is inserted.

Individual elements in the foregoing embodiments of the invention are also described herein as discrete hardware components having a specific function, but the invention is not limited to such implementations and part or all of the elements of the invention can be achieved as software constructions executed by a DSP or other general-purpose hardware configuration.

APPLICATIONS IN INDUSTRY

An OFDM signal receiving apparatus according to the present invention improves reception performance by reducing frequency response estimation error, and reduces the circuit scale needed for a hardware implementation and the number of operations performed in a software implementation. The OFDM signal receiving apparatus of this invention can therefore be beneficially used as a digital broadcast receiver, wireless LAN modem, cell phone, or other wireless communication terminal. The invention can also be used in wired communication modems connected to a telephone line, power line, coaxial cable, or optical fiber, for example.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An OFDM signal receiving apparatus for receiving OFDM signals containing a pilot signal of known amplitude and phase, comprising:
    a first Fourier transform means for generating an OFDM signal in the frequency domain by a Fourier transform of the OFDM signal;
    a first dividing means for dividing the pilot signal contained in the frequency domain OFDM signal by a specified pilot signal, and generating a first frequency response;
    a window function multiplying means for multiplying the first frequency response by a window function, and generating a second frequency response;
    an inverse Fourier transform means for generating a first impulse response by an inverse Fourier transform of the second frequency response;
    a coring means for replacing data in the first impulse response less than or equal to a specified threshold value with zero signals, and generating a second impulse response;
    a second Fourier transform means for generating a third frequency response by a Fourier transform of the second impulse response;
    a window function dividing means for dividing the third frequency response by the window function, and generating a fourth frequency response;
    a time axis interpolation means for interpolating the fourth frequency response along the time axis, and generating a fifth frequency response;
    a frequency axis interpolation means for interpolating the fifth frequency response along the frequency axis, and generating a sixth frequency response; and
    a second dividing means for dividing the frequency domain OFDM signal by the sixth frequency response to compensate for amplitude and phase distortion introduced to the signal on the channel.

2. An OFDM signal receiving method for receiving OFDM signals containing a pilot signal of known amplitude and phase, comprising:
    a step of generating an OFDM signal in the frequency domain by a Fourier transform of the OFDM signal;
    a step of dividing the pilot signal contained in the frequency domain OFDM signal by a specified pilot signal, and generating a first frequency response;
    a step of multiplying the first frequency response by a window function, and generating a second frequency response;
    a step of generating a first impulse response by an inverse Fourier transform of the second frequency response;
    a step of replacing data in the first impulse response less than or equal to a specified threshold value with zero signals, and generating a second impulse response;
    a step of generating a third frequency response by a Fourier transform of the second impulse response; a step of dividing the third frequency response by the window function, and generating a fourth frequency response;
    a step of interpolating the fourth frequency response along the time axis, and generating a fifth frequency response;
    a step of interpolating the fifth frequency response along the frequency axis, and generating a sixth frequency response; and
    a step of dividing the frequency domain OFDM signal by the sixth frequency response to compensate for amplitude and phase distortion introduced to the signal on the channel.

* * * * *